United States Patent [19]

Ghiringhelli

[11] 4,100,476
[45] Jul. 11, 1978

[54] SINGLE SECONDARY DIMMING INVERTER/BALLAST FOR GAS DISCHARGE LAMPS

[75] Inventor: Horace Ghiringhelli, Dumont, N.J.

[73] Assignee: Isodyne, Inc., Nanuet, N.Y.

[21] Appl. No.: 769,159

[22] Filed: Feb. 16, 1977

Related U.S. Application Data

[63] Continuation of Ser. No. 572,941, Apr. 29, 1975, Pat. No. 4,016,477.

[51] Int. Cl.² .............................................. H02M 7/00
[52] U.S. Cl. ...................................... 315/297; 307/17; 315/212; 315/257; 336/215
[58] Field of Search ............... 307/17, 30, 32; 323/48, 323/89 C; 336/182, 214, 215; 315/212, 257, DIG. 2, DIG. 5, DIG. 7, 219, 247, 297; 321/26

[56] References Cited

U.S. PATENT DOCUMENTS

4,016,477  4/1977  Ghiringhelli .......................... 315/212

Primary Examiner—Davis L. Willis
Assistant Examiner—Bob Wise
Attorney, Agent, or Firm—Brumbaugh, Graves, Donohue & Raymond

[57] ABSTRACT

A highly efficient, energy saving ballasting and transfer circuit, utilizing a single high frequency inverter ballast unit, capable of powering multiple lamp loads from any direct or alternating electric power source, comprises a current feedback inverter in combination with a leakage transformer, which operates to permit coupling of the single inverter unit to any number of lamps, particularly the gas discharge type. The leakage transformer can power any number of lamps from a single source which, because of its linear transfer function, achieves controlled light output of the lamps proportional to the power input. Thus, an excellent dimming capability is achieved. It is important to note that this leakage transformer is a special case of a certain type of multi-path leakage transformer, where only one secondary coil is used to achieve the same dimming capabilities of multiple secondary embodiments.

7 Claims, 6 Drawing Figures

FIG. 6

SINGLE SECONDARY DIMMING INVERTER/BALLAST FOR GAS DISCHARGE LAMPS

BACKGROUND OF THE INVENTION

This application is a continuation of my earlier co-pending application Ser. No. 572,941, filed Apr. 29, 1975, now U.S. Pat. No. 4,016,477.

The present invention relates to ballasting and electrical power transfer circuits. More particularly, this invention relates to a highly efficient, energy saving inverter ballast unit capable of operating multiple sets of lamps from any direct or alternating electric power source and to a novel multi-path leakage transformer used therein. The inverter ballast of the invention is particularly useful in operating gas discharge lamps, such as fluorescent lights.

Various types of electronic ballast systems for powering fluorescent lighting are known and presently used in industry and by the consumer. The converter-type electronic ballast is used to convert direct to alternating current in a portable battery set-up for powering relatively small fluorescent lamps of 8 to 25 watts, used, for example, in camping lanterns. For larger fluorescent lamps up to about 40 watts, such as for use on buses, trains, and airplanes, electronic converter ballasts are used which operate at so-called high frequencies of about 10,000 cycles, which are quite noisy. Since converter-type ballasts operate from a DC source, convenience, rather than efficiency of operation, is the primary consideration.

High-power inverter ballasts which operate at high frequencies from DC power sources are presently in use. These ballasts are used to ignite and maintain gas discharge lamps totaling, for instance, in the order of 20 kilowatts. However, in most known inverter ballasts, the inverter or power source is separate from the inductive-type ballast (when this type is used) for each lamp. While the efficiency of the above-described system can be increased by increasing the frequency, since increased frequency increases lamp efficiency and, therefore, light output, thus the final efficiency levels attained are considerably lower, because of losses in the separate ballast coils, than the levels approached by this invention.

Lastly, the standard inverter ballast used for home fluorescent lighting operates from either the normal 50/60 Hz AC or, in some cases, from a DC utility line, to produce, rather inefficiently, a given quantity of light.

More recent ballast systems have a dimming means by which the lamp light output may be reduced and, accordingly, power consumption may be decreased in some proportion. Such dimming means may consist of either a switch which connects different tap windings within a standard ballast coil, or an electronic SCR control which, when connected to the ballast, reduces the power supplied to the lamp (or lamps). The present invention, in contrast to the above, has an inherent dimming capability which permits the inverter ballast to vary continuously the lamp light output and reduce linearly, in a direct proportion, energy input into the device. Because of these features, the energy savings of this invention are considerably and dramatically higher than presently available dimmers for fluorescent lamps.

SUMMARY OF THE INVENTION

In accordance with the present invention, a novel inverter ballast is provided which operates at high frequencies of approximately 20 KHz and higher, from either a DC or an AC electric power source. This inverter ballast system comprises an inverter, preferably a current feedback inverter, tuned to a high frequency which optimizes lamp operation, and a novel leakage transformer, connected between the inverter and the lamps, which functions to provide a multi-path magnetic circuit, thus permitting the operation of many sets of lamps from a single power source. The multi-path leakage device according to the invention, utilized in the inverter ballast, is a novel multi-function transformer. It comprises a primary coil and any number of secondary "satellite" coils which are part of independent magnetic circuits. These magnetic circuits are so arranged that each secondary coil is part of a unique and separate path, even though each, regardless of number, passes in common through the primary coil.

In the operation of the inverter ballast, the inverter passes a current through the primary coil of the multifunction leakage transformer. This current develops a voltage across the primary which is converted into individual voltage levels, as determined by each secondary magnetic circuit path. These individual secondary voltages are parameters designed, for any given case, in conjunction with the proper level of leakage reactance for each individual satellite secondary winding. These parameters, both voltage levels and leakage reactances, establish the required operating point, so that each individual set of lamps may be provided with adequate voltage levels to ignite the arcs and, also, precise series reactances for ballasting to drop secondary output voltages to nominal lamp operating voltages. It is inherent in the operation of the multi-path transformer that secondary series inductance is built into the satellite winding, so that both ballasting means and sufficient arc starting voltage are part of one and the same winding. This feature obviates the requirement for an extra ballast coil in addition to the secondary winding coil. Accordingly, the multi-function transformer, in effect, couples the inverter to multiple sets of lamps so that lamp banks of any power rating may be served from a single source without a multiplicity of separate ballasts.

In this way, an inverter ballast system of surprisingly high efficiency is achieved such that less energy is drawn from the power source to provide the same quantum of light as presently known ballasts. The present ballast system is based upon a circuit design which takes advantage of the increased operating efficiency of fluorescent lamps at higher frequencies compared to the 50/60 Hz utilized by standard ballasting systems. Moreover, the preferred use of a low loss, high performance current feedback inverter, tuned to an optimum frequency above about 20 KHz, has the ability to maximize gas discharge lamp light output, particularly for fluorescent lighting, and minimize inverter ballast power losses close to theoretical limits. The excellent transfer of power from the electric source to the lamps yields considerably higher power conversion and operating efficiencies than that presently available from conventional low frequency (<400 Hz) ballasts.

It is seen, therefore, that the high efficiency and many other advantages of the invention flow from the unique multi-path transformer. The use of a common primary and independent magnetic leakage path for each secondary coil permits connection of a single inverter power source to multiple light sources. Operation at ultrasonic levels from a DC or an AC source also aids in quiet and efficient use.

DETAILED DESCRIPTION OF THE PREFERRED EMBODIMENTS

All these advantages and benefits, as well as the arrangement of the inverter ballast and leakage transformer according to the invention, will be more apparent from the following detailed description and the appended drawings which illustrate the most preferred embodiments of this invention.

Figure 1:
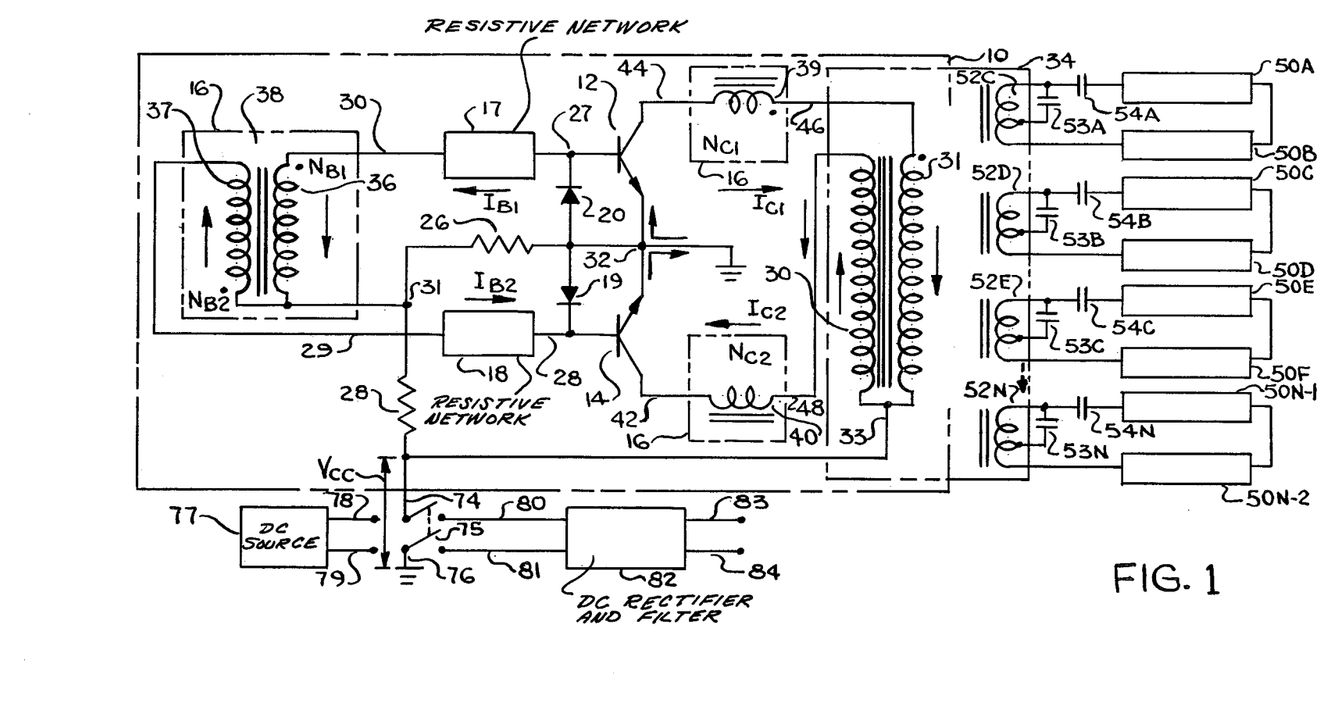
FIG. 1 is a schematic diagram of a preferred embodiment for the circuit of an inverter ballast, feeding circuits, and gas discharge lamp loads according to the invention.

Referring to FIG. 1 of the drawings, a self-saturating current feedback inverter 10 comprises semi-conductor switches 12 and 14, a self-saturated transformer 16, drive networks 17 and 18, clamp diodes 19 and 20, bias resistors 26 and 28, and the primary windings 30 and 31 of the output leakage transformer 34. This conventional current feedback inverter, powered from voltage source "$V_{cc}$," functions as follows: Assuming that the semi-conductor switch (NPN Transistor) 12 is conducting, this will cause current to flow through winding 36 of transformer 16 through drive network 17 and bias resistor 26, which, in turn, will cause a voltage drop across winding 36, network 17, and resistor 26. This voltage will be impressed between junction points 32 and 27. The base-to-emitter junction of the transistor switch 12 will clamp this voltage to a value equal to $V_{BE}$, explained below. Transformer 16 acts as a current transformer to provide base drive for transistor switch 12. The time it will take to saturate the core 38 of transformer 16 is given by voltage ($E = V_{BE} + V_1$), as defined below.

Transformer 16 operates fully saturated and the turns ratio between windings of primary coils 36 and 37 and secondary coils 39 and 40 establishes a current gain on the electronic switches 12 and 14, and forces a linear primary current flow in the leakage transformer 34 as a function of secondary load power demand. The current flow through the switches 12 and 14 is held fixed, relative to the switch conduction time.

The frequency of operation, as in any current feedback inverter, is essentially independent of input DC voltage, is primarily determined by $$F_{op} = (E \cdot 10^8)/(4 \cdot N_B \cdot A \cdot B_M) \qquad (I)$$

wherein:

$F_{op}$ = frequency of operation of inverter (unloaded)
$E = (V_{BE} + V_1)$ voltage
$V_1$ = voltage drops across networks 17 and 18 during half cycle
$V_{BE}$ = transistor switch voltage drop
$N_B$ = one-half of primary winding of transformer 16
$B_M$ = saturation flux density of the core 38 magnetic material used in the driver transformer 16
$A$ = effective core cross-sectional area of the driver transformer 16.

This circuit operates as a regenerative oscillator, as the clamped $V_{BE}$ voltage across network 17 and winding 36 is sustained, and drive transformer 16 saturates, the current required for magnetization of the core 38 detracts base current drive from transistor switch 12, the voltage drive impressed on the switch collapses, thus transistor switch 12 turns off. As switch 12 turns off, current will flow through winding 37, drive network 18, and resistor 26, and cause transistor switch 14 to turn on and another self-saturating cycle to be repeated, identical to the one performed by transistor switch 12 and its associated drive circuit (components 17, 36, and 26). Resistors 26 and 28 form a divider network which provides an adequate starting voltage at junction 31, which is the center tap formed by drive windings 36 and 37. This assures sufficient unbalance between the drive circuits of switches 12 and 14 so that one or the other will be assured to be conducting when power is first applied. Diodes 19 and 20 act as clamps during the back-bias turn-off times of switches 12 and 14, thus assuring protection from secondary voltage breakdown of the base-to-emitter junction.

Leads 44 and 42 connect the collectors of switches 12 and 14, respectively, to the secondary windings 39 and 40 of drive transformer 16. Leads 46 and 48 close the loop, connecting the collectors of switches 12 and 14 through windings 39 and 40 to the output leakage transformer 34. The output circuit of the semi-conductor switches is completed, as shown by the current vectors drawn in FIG. 1. When switch 12 is turned "on" and current $I_{C1}$ flows through winding 39, current flows through transformer primary 31. Collector current $I_{C1}$, which flows during half of the inverter cycle, is proportional to the load current circulating in the secondaries of transformer 34. This current $I_{C1}$, by means of the current drive transformer 16, produces a current $I_{B1}$ in the drive circuit of the semi-conductor switches. This establishes a forced gain in switch 12 given by $G_1 = (N_{C1}/N_{B1}) = (I_{C1}/I_{B1})$. Where $N_{C1}$ represents the number of turns of winding 39, $N_{B1}$ represents the number of turns of winding 36 and currents $I_{C1}$ and $I_{B1}$ are shown by the corresponding vectors in FIG. 1. Once switch 12 turns off, the identical cycle is repeated for switch 14, where current $I_{C2}$ flows through winding 40 and primary winding 30 of transformer 34, which causes current $I_{B2}$ to flow through winding 37 of drive transformer 16 and a forced gain condition is given as for switch 12, but as follows $G_2 = (N_{C2}/N_{B2}) = (I_{C2}/I_{B2})$ As may be seen from equation (*I*), by changing the voltage E, the operating frequency may be changed. If a given secondary of transformer 34 is tuned to a given frequency, then by varying E through changes in feedback networks 17 and 18, the current flow through the inverter 10, and thus through the primary coils 30 and 31 of transformer 34, is varied. Hence, the current load may be changed to any desired value, independently of load voltage.

Switched currents $I_{C2}$ and $I_{C1}$ cause voltage drops on each consecutive half cycle across primary windings 30 and 31 of transformer 34. Windings 30 and 31 are symmetrical and have an identical number of turns for any given design. When switch 12 is conducting, a voltage equal to that impressed on winding 31 is induced on winding 30 and vice-versa when switch 14 is conducting and switch 12 is turned off. This causes a voltage equal to 2 $V_{CC}$ to be impressed on the total primary winding from lead 46 to lead 48. This primary voltage is converted to appropriate levels by the secondary windings of transformer 34 and fed to the lamps, thus accomplishing the transfer of power from the current inverter to the load banks.

Figure 2:
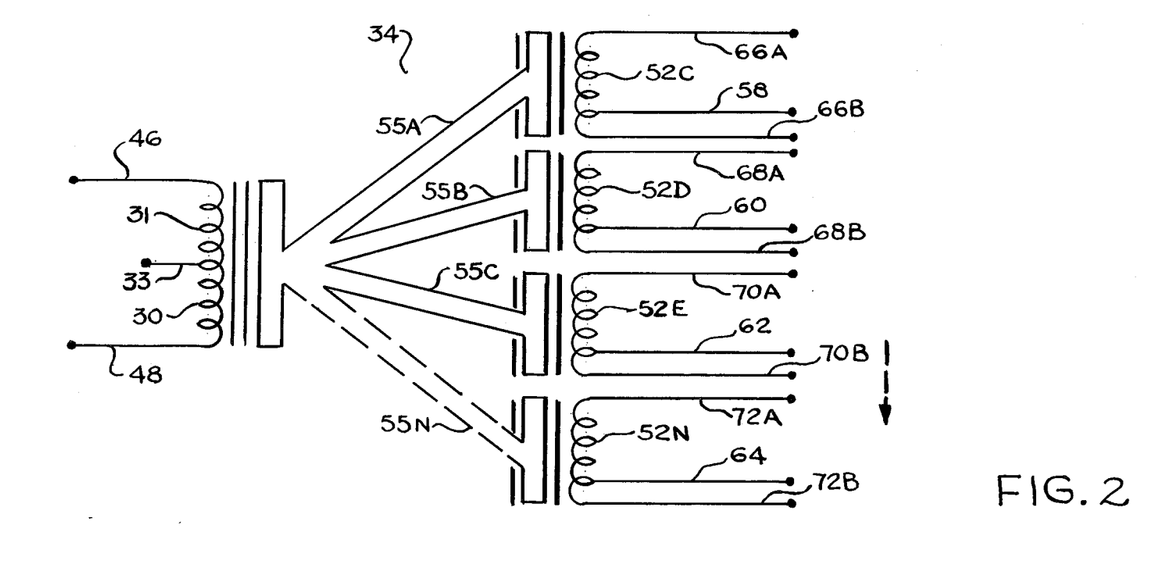
FIG. 2 is the symbol for the primary coil, multiple secondary satellite coils, and linking magnetic circuits which comprise the multi-path leakage transformer according to the invention.

The following is a detailed description of the operation of the special multi-path leakage transformer 34. The transformer 34, which the current feedback inverter feeds, is a unique device which performs several functions while yielding a highly controllable and efficient energy transfer between the inverter 10 and independent sets of gas discharge lamps, such as fluorescent lamp types, 50-A to 50-N. The transformer 34, which may be termed as "multi-path, independently controlled leakage transformer," consists of primary coils 30 and 31 and any given number (dependent upon design) of secondary, or "satellite," coils, 52-C, 52-D, 52-E . . . 52-N, which are part of independent magnetic circuits, as best seen in FIG. 2. Each secondary coil is part of a separate and independent magnetic path, again as shown in FIG. 2. All magnetic circuits, regardless of number, pass in common through the magnetic core 130 of primary coils 30 and 31 of the transformer 34. Considerable magnetic leakage is purposely introduced into each magnetic circuit, so that each secondary coil 52-C to 52-N not only transforms by the turns ratio the voltage impressed upon the primary by the current feedback inverter 10, but also acts as a ballast with a lagging power factor. This magnetic leakage in the secondary satellites creates a leakage reactance, in the conventional manner, which is effectively in series with the load (lamps), thus acting as a ballast coil and as an intrinsic element developed by each individual leakage flux which is not part of the mutual primary-to-secondary magnetic flux. The amount of leakage and voltage ratios may be independently controlled for each magnetic path, i.e., either 55-A, 55-B, 55-C . . . 55-N, without appreciably affecting other secondary paths. This permits the coupling of the inverter to individual sets of lamps, and the ability to provide adequate leakage inductance to act as a ballast for each set is realized. The energizing of multiple sets of lamps from a single inverter is also achieved without the need for the conventional individual ballast or the need for a primary winding for each secondary (whether by means of the standard auto transformer or standard isolation transformer). Further, each secondary (52-C, 52-D, 52-E, 52-N) may be individually tuned to obtain required energy transfer at a given frequency. This results in maximum energy transfer and minimum losses over conventional methods of energizing gas discharge lamps (fluorescent, etc.) at high frequencies. This also optimizes output light from the lamps (in total lumens) for a given power input into the inverter, thus efficiency is maximized.

FIG. 2 is specifically intended to define the symbol for the multi-path leakage transformer 34. In its general form, the multi-path leakage transformer 34 is shown having one primary coil 30 and 31, which may or may not be center tapped (depending on the type of inverter used). The independent magnetic paths, which may be any number, are diagrammatically shown as four, 55-A, 55-B, 55-C, and 55-N, in FIG. 2. The last magnetic path 55-N is shown by dash lines indicating that it is the last path in transformer 34, regardless of any number of paths in between. For any given design, an exact number of magnetic leakage paths (from one on up) should be shown, one corresponding to each secondary satellite coil. Leads 58, 60, 62, and 64 are the taps in each satellite winding provided for an individual tuning capacitor, e.g., 53-A, 53-B, 53-C . . . or 53-N. The sets of leads 66A-66B, 68A-68B, 70A-70B constitute the output ports of the multi-path leakage transformer 34 which feed the ballast capacitors 54-A, 54-B, 54-C . . . 54-N and lamp loads 50-A through 50-N. Leads 46 and 48 constitute the input ports to leakage transformer 34. Lead 33 is the center tap, if used.

Figure 3:
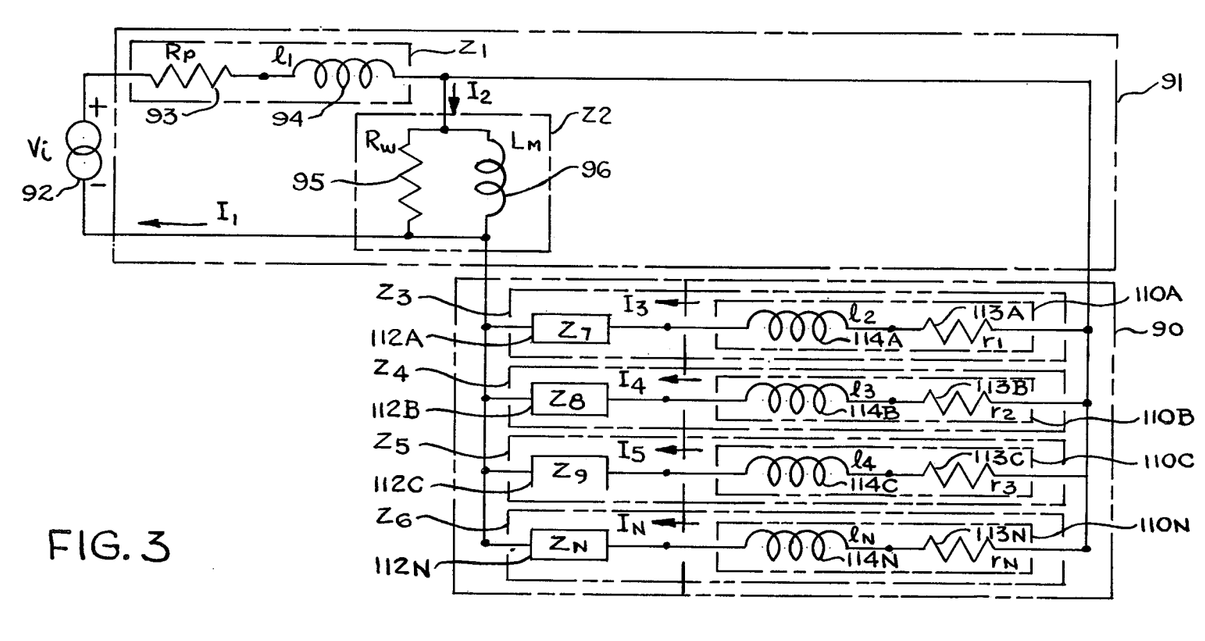
FIG. 3 is a schematic drawing of the equivalent circuit for the multi-function leakage transformer as defined in this invention.

Referring to FIG. 3 of the drawings, an equivalent circuit for the multi-path leakage transformer 34 is shown where all distributed capacities are ignored, where the relevant distributed leakage inductances are depicted as equivalent lumped parameters. For the sake of comparison against conventional leakage transformer, other losses, such as core losses and $I^2R$ copper losses, both for primary and secondaries, are also shown as lumped parameters in this equivalent circuit. Further, the effects of the tuning capacitors 53-A, 53-B, 53-C . . . 53-N (refer to FIG. 1) have been ignored for the sake of simplicity in this analysis of the equivalent circuit of FIG. 3. In FIG. 3, the ideal voltage source 92 respresents the output voltage impressed upon the transformer primary 34. Resistance 93 represents all lumped DC and AC source and series resistances of the transformer primary circuit 91. Series inductance 94 represents all primary leakage inductances caused by those linkages of flux which are not mutual between primary and secondaries. Resistance 95 represents all parallel AC losses of the primary circuit 91, these being mostly due to hysteresis and eddy current losses in the transformer's magnetic core. Parallel inductance 96 represents the total equivalent self-inductance of the transformer referred to the primary and is the mutual inductance caused by the mutual flux only.

The secondary satellite circuits 90 comprise any and all secondary independent magnetic circuit paths. For the sake of description, four secondaries are shown in the equivalent circuit. Each and all secondaries, 110-A, 110-B, 110-C . . . 110-N, and their associated input loads 112-A, 112-B, 112-C . . . 112-N, as shown, are referred to the primary 91. The number of possible secondaries is only determined by the requirements of any given design as established by the number of lamps to be powered and the type of feeding circuits employed.

The lumped parameters within boxes 110-A to 110-N in FIG. 3 represents, respectively, secondaries 52-C to 52-N in FIG. 2. Again, there is no significance to the number of secondaries represented for the symbol in FIG. 2 or for the equivalent circuit in FIG. 3. This number was chosen for convenience in describing the function of the multi-path independently controlled leakage transformer in this invention. Resistances 113-A, 113-B, 113-C . . . 113-N represent all series resistances referred to the primary for secondaries 110-A, 110-B, 110-C . . . 110-N, respectively. Inductances 114-A, 114-B, 114-C . . . 114-N represent the independent leakage inductances for each secondary 110-A through 110-N, which make this multi-path transformer so unique and different from other conventional leakage transformers. These series leakage inductances 114-A through 114-N, as may be derived from the equivalent circuit, act so as to isolate effectively the secondaries from each other in terms of loading. Elements 112-A, 112-B, 112-C, and 112-N represent the total, individual, complex impedance load (equivalent lamp and ballast feeding circuit reactances, mostly capacitive) for each secondary 110-A through 110-N.

The equivalent circuit for conventional leakage transformers is such that the secondary leakage inductances are all lumped into a single inductance element referred to the primary, which is in series with the parallel combination of secondary loads. Therefore, in a conventional leakage transformer, it is impossible to isolate effectively the output voltage of one secondary from another. When one secondary is loaded, all are loaded. Contrary to conventional leakage transformers, the multi-path leakage transformer 34 provides individual leakage reactances in series with each secondary. Thus, each secondary lamp load may be ignited independently and the voltage drop (from lamp ignition voltage to lamp operating voltage) caused across its individual leakage reactance (for ballasting) does not affect, to any great extent, the voltage drops across the other secondary lamp loads. The extent to which interaction or loading occurs between individual satellite secondaries depends only upon the degree of perfection obtained by any given design in approaching the theoretical equivalent circuit of FIG. 3. It is the fact that independence from secondary interactive loading is obtained, while building into each individual secondary enough leakage reactance that makes the multi-path leakage transformer 34 such an important element in saving costs and making economically feasible the powering of multi-lamp loads from a single inverter feeding a single primary and multiple secondaries, without the need of additional ballast reactances in series with each secondary load of lamps.

Figure 4:
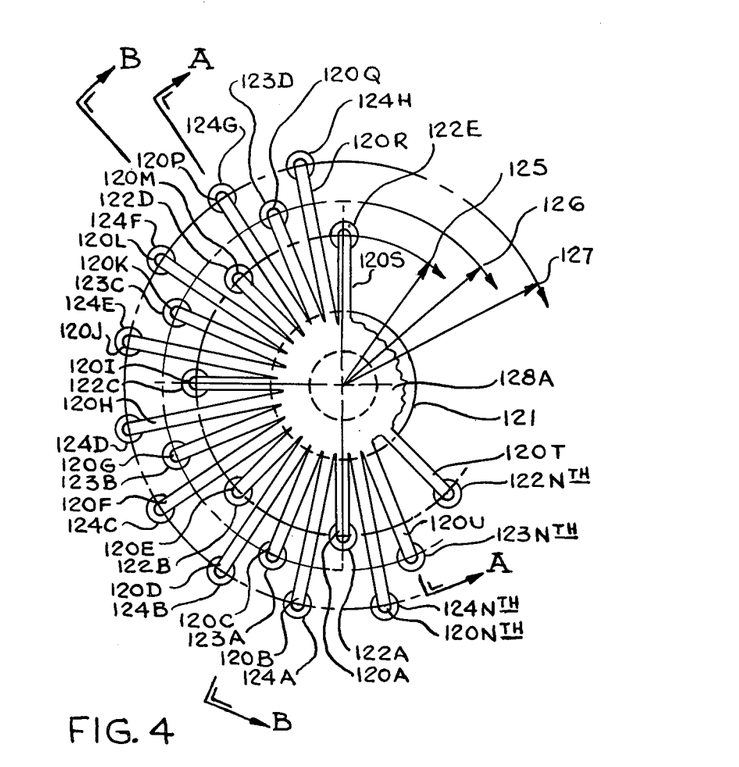
FIG. 4 is a mechanical outline drawing of the multi-path leakage transformer shown in FIG. 2.

The geometry of the multi-path leakage transformer is relevant in obtaining the desired results of independent leakage reactance for each secondary magnetic path. The reason for this is that the loading of each secondary is isolated "to a great extent" by the series leakage inductance of all other secondaries. At the limit, if the individual leakage inductance of each and every secondary is by concept and design large enough when compared with any given secondary load (lamp and feeding circuit), the multi-path transformer 34 achieved will have independent voltage control of each secondary and built-in leakage for ballast action into each separate satellite path.

The following are mathematical expressions for the equivalent circuit of FIG. 3:

$$I_1 = I_2 + I_3 + I_4 + I_5 \ldots I_N \tag{II}$$

$$1/Z_T = 1/Z_2 + 1/Z_3 + 1/Z_4 + 1/Z_5 + \ldots 1/Z_6 = Z_x \tag{III}$$

$$\frac{1}{Z_T} = \frac{1}{Z_2} + \frac{1}{Z_3} + \frac{1}{Z_4} + \frac{1}{Z_5} + \ldots \frac{1}{Z_6} = Z_x \tag{III}$$

$$I_P = \frac{V_i}{Z_1 + Z_x} \tag{IV}$$

$$Z_1 = R_p + jwl_1 \tag{V}$$

$$Z_2 = \frac{(R_w \cdot j \cdot wL_M \cdot K_M)}{R_w + jwL_M \cdot K_M} \tag{VI}$$

$$Z_3 = a^2(Z_7 + jwl_2 + r_1) \tag{VII}$$

$$Z_4 = h^2(Z_8 + jwl_3 + r_2) \tag{VIII}$$

$$Z_5 = y^2(Z_9 + jwl_4 = r_3) \tag{IX}$$

$$Z_6 = x^2(Z_N + jwl_N + r_N) \tag{X}$$

$$jwl_2 = \frac{Z_3 - [a^2(Z_7 + r_1)]}{a^2} \tag{XI}$$

$$jwl_3 = \frac{Z_4 - [h^2(Z_8 + r_2)]}{h_2} \tag{XII}$$

$$jwl_4 = \frac{Z_5 - [y^2(Z_9 + r_3)]}{y_2} \tag{XIII}$$

$$jwl_N = \frac{Z_6 - [x^2(Z_N + r_2)]}{x^2} \tag{XIV}$$

In formulas II to XIV, the following expressions are used:

$R_p$ is the sum of all inverter source resistances and transformer primary winding resistance.

$l_1$ is the primary leakage inductance.

$R_w$ is the sum of all core losses.

$L_M$ is the equivalent self-inductance combination of both primary and secondary.

$K_M$ is a constant related to mutual inductance and the coupling factors between primary and all secondaries.

$r_1, r_2, r_3 \ldots r_N$ are the equivalent secondary winding resistances for each individual secondary.

$l_2, l_3 \ldots l_N$ are the individual leakage inductances for each secondary.

$a, h, y, x$ are coefficients for each secondary, directly related to the turns ratio between primary and each secondary, as well as the corresponding coupling factor between primary and each secondary.

$Z_7, Z_8, Z_9 \ldots Z_N$ are the equivalent total impedances (which include lamp equivalent impedance and feeding ballast impedance) for each secondary load. Tuning capacitor and tapped winding ignored.

$Z_3, Z_4, Z_5, Z_6$ are total branch impedances for each secondary and its respective load.

$Z_2$ is the total shunt impedance referred to the primary.

$Z_1$ is the total series primary impedance.

$V_i$ is the equivalent voltage source which represents the inverter voltage applied to the primary of the transformer.

$I_1$ is the total primary current under load.

$I_2$ represents the sum of the magnetizing and exciting currents.

$I_3, I_4, I_5, \ldots I_N$ are the individual branch secondary currents under load.

Referring to FIG. 4 of the drawings, a mechanical outline drawing is shown of a multi-path leakage transformer 116, depicting the basic primary coil 121, the secondary satellite coils 122-A to 122-N, 123-A to 123-N, 124-A to 124-N, and one of many possible magnetic core designs. Since the multi-path independently controlled leakage transformer 116 is a universal concept which permits the design of an inverter ballast system such that any number of gas discharge lamps of any power rating may be ignited, only a typical layout can be depicted for the purpose of a physical description. There is no minimum nor maximum in the number of secondary satellite magnetic paths that may be designed in applying the basic principal as already defined. The central primary winding 121 must be located so that each and every independent magnetic path shares in common in the central core going through the primary winding (or windings). The magnetic circuit path design must be such that, except for the leakage flux linkages which will exist, due mostly to the distance between the primary coil 121 and any given secondary satellite coil series 122, 123, 124, the sum of all flux linkages passing through all satellite windings must be equal to the total magnetic flux linkages flowing through the primary.

For the basic independently controlled leakage transformer principle to operate, there is no need for any given secondary satellite coil to be at any minimum or maximum distance from the center of the primary coil. Nor is there a need for any given symmetry to exist between the primary coil and any or all secondary coils. There is a basic requirement, however, for each secondary coil to possess a separate magnetic circuit path return through the primary coil. Practical considerations, as well as the key electrical parameters of desired leakage inductance and the ratio of no-load to full load output secondary voltage. The greater the physical separation for a given design between secondary satellite coils and the lesser the number of secondaries, the greater the loading isolation between secondaries. Theoretical limits will obviously be imposed by the conflicting parameters of required loading isolation between secondaries, maximum acceptable leakage (besides that desired for ballasting), and the maximum number of secondaries necessary to power a certain number of lamp loads.

Figure 5:
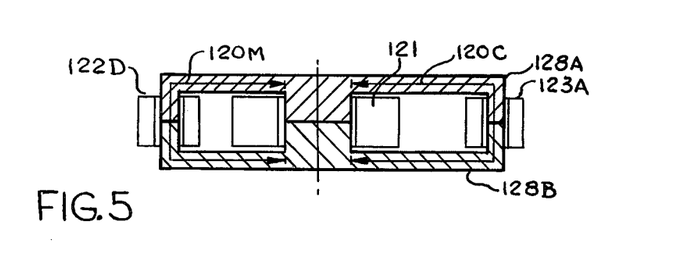
FIG. 5 is a cross-section of the transformer shown in FIG. 4 taken along line B—B.
Figure 6:
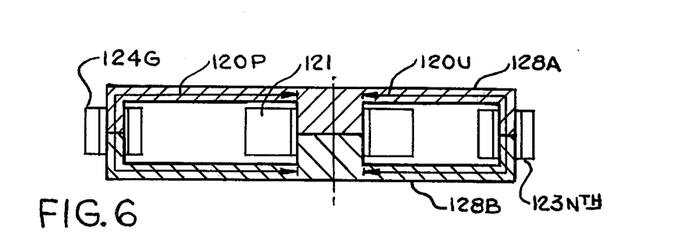
FIG. 6 is a cross-section of the transformer shown in FIG. 4 taken along line A—A.

The typical top view of the multi-path leakage transformer depicted in FIG. 4 shows the "independent magnetic paths" as 120-A, 120-B, 120-C ... 120-N. The secondary satellite coils are shown typically on three radii, 125, 126, and 127. Radius 127 is represented as the "Nth radius," which is the last of any number. Again, there is no minimum nor maximum to the number of radii on which the secondary satellite coils should fall. A single radius may be used for all secondary satellite coils. On radius 125 fall secondary satellite coils 122-A, 122-B, 122-C ... 122-N. On radius 126 fall secondary satellite coils 123-A, 123-B, 123-C ... 123-N. On radius 127 fall secondary satellite coils 124-A, 124-B, 124-C ... 124-N. Sections A—A and B—B show cross-section views of the primary 121 and secondary satellite coils 122-D, 123-A, 123-N, 124-G, and magnetic core 128-A and 128-B. The magnetic core consists of two halves, a top 128-A and a bottom 128-B. Although these two halves are shown symmetrical in FIG. 4. they do not need to be, except to be complementary to each other in order to close each and every independent magnetic path, 120-A through 120-N. Sections A—A and B—B show the independent magnetic paths 120-C, 120-M, 120-P, and 120-U for the particular cross-sectional view, where it can be seen that they form an integral part of what is defined as the magnetic core 128-A and 128-B. Air gaps may be introduced in the magnetic circuit of any independent magnetic path for any given secondary satellite winding without affecting the other independent magnetic paths. The purpose of these air gaps may be either the tuning to a certain frequency of a given secondary winding, or the control of the amount of leakage inductance desired for a given independent magnetic path.

The magnetic material used in implementing the core 128-A and 128-B is dependent upon the particular design and affected by such considerations as power rating of the multi-path leakage transformer, operating frequency of the inverter, desired efficiency levels, and other parameters peculiar to the given design. Regardless of the magnetic material used, which, typically at the operating frequencies of interest, will be some kind of low-loss ferrite, the basic principle of operation of the multi-path leakage transformer will not be affected. In any event, in implementing a given multi-path leakage transformer design, any known magnetic material may be used to satisfy the electrical requirements of the basic principle described herein.

Referring back to FIG. 1, capacitors 53-A, 53-B, 53-C ... 53-N perform the dual function of de-spiking and tuning, for optimum power transfer, the power frequency from the inverter driver transformer 16 to the individual sets of lamps 50-A through 50-N. Capacitors 54-A, 54-B, 54-C ... 54-N perform as voltage divider feed ballasts. The DC input voltage to the inverter ballast is shown as "$V_{cc}$" impressed upon leads 74 and 76 across switch 75. If the requirement is to operate the inverter ballast as a DC-to-DC converter, switch 75 should be connected to a suitable DC source (battery or power supply) 77, across leads 78 and 79. If the requirement is to operate the inverter ballast as an inverter from an AC source, switch 75 should be placed across leads 80, and 81, which are the output of any suitable DC rectifier and filter 82. Switch 75 may be used in actuality if a given application calls for the versatility of operation from either a DC or an AC source; however, if the inverter ballast is to operate from only one type of source, either DC or AC, the need for switch 75 is obviated. If an AC voltage source is used to power the inverter ballast, its output must be applied to leads 83 and 84. The voltage range, the frequency range, and wave shape of the AC source used to power the inverter ballast is not limited by the concept of this invention. Practical considerations, and the state of the art of the components and technology used in any given actual implementation of this inverter ballast, will be the limiting factors determining the ranges and types of DC and AC power sources that may be used. There are no intrinsic limitations.

A very special feature of this invention, due to its linear power transfer function, as previously mentioned, is the ability to operate over an extremely wide range of input voltages. If a continuously variable power source (a variac for AC operation or power supply for DC) is used to feed the inverter ballast across leads 74 and 76, it is possible to dim the light output of the lamp loads linearly over a very wide dynamic range and, in the process, dramatically reduce the power consumption from said variable sources. Networks 17 and 18, shown in FIG. 1, may consist of a variety of linear or non-linear resistive devices, customized for any given design application. The main purpose of these networks is to provide a convenient means to dim the light output (or control it) of the lamps by controlling the power level delivered to the loads. Networks 17 and 18, by increasing or decreasing the resistance in series with the semiconductor switches 12 and 14, provide variable voltage drops with, in turn, vary the operating frequency of the current feedback inverter, as set forth in equation (I), and cause (through de-tuning of secondaries 52-C, 52-D, 52-E ... 52-N in conjunction with tuning capacitors 53-A, 53-B, 53-C ... 53-N, and by varying the voltage drops across ballast capacitors 54-A, 54-B, 54-C . . . 54-N) the increase or decrease of power delivered to the lamps.

The inherent dimming capability of this invention provides:

1. The ability to dim the light output from the lamp loads by means of a variable resistance from a single source.
2. The ability to control automatically the desired output light level from the lamp loads by means of switched fixed resistance values, relay control resistance values, resistance values set by out sophisticated digital controller for any program level of lighting required, etc.
3. The ability to maintain fixed lighting levels independent of lamp life and/or ambient lighting conditions by means of photo-conductive cells or photo-detectors.
4. The ability to obtain special desired lighting effects by the use of non-linear networks.

This invention may be varied to accommodate an unlimited number of designs, types of gas discharge lamps of various ratings, power levels, and number of lamps, all according to the basic principle of the invention. Also, conventional power sharing techniques may be employed (by the parallel or series connection of multiple transistor switches) to boost the voltage and/or current handling capabilities of the electronic switches 12 and 14. Further, although the electronic switches 12 and 14 depicted in FIG. 1 are shown as NPN transistors, the inverter ballast will operate just as well if PNP transistors are used in any given design. However, if PNP devices are employed for switches 12 and 14, diodes 19 and 20 must be reversed, and the polarity of the input DC voltage into the inverter, $V_{CC}$, must also be reversed. Lastly, a multitude of ballasting techniques, obvious to those skilled in the art, may be used to power lamps using the basic inverter and multipath leakage transformer circuit shown herein.

OTHER EMBODIMENTS

In addition to the preferred embodiments, as shown in FIG. 1, there are other possible embodiments which may be implemented using the basic multi-path leakage transformer principle, all relating to the powering of gas discharge lamps. A variation of the circuit shown in FIG. 1 is the replacement of the current feedback inverter by either voltage or hybrid feedback inverters. If a voltage feed-back inverter is used, it should degrade the linear transfer voltage and power range; however, fairly high efficiencies should still be possible for a fixed input voltage. If a hybrid feedback circuit is used (current and voltage), the operating characteristics and range of operation will be between those obtained using the circuit depicted in FIG. 1 and those of a voltage feedback inverter.

Another variation of the preferred embodiment will be the addition of a driver and oscillator to feed the primary of transformer 16 (FIG. 1), thus converting transformer 16 from a self-saturating device into a linear-transfer device. This will increase the versatility and power handling capabilities of the over-all system by converting the current feedback inverter into a driven inverter.

Another possible embodiment is the replacement of the current feedback inverter 10 (FIG. 1) by any type of SCR inverter or converter. In general, this will increase considerably (depending upon the state of the art) the power handling capability of the inverter ballast without resorting to the use of multiple switches (in series and/or parallel).

Another possible embodiment employs the circuit depicted in FIG. 1, except that each pair of lamp loads (such as lamps 50-A and 50-B) for each secondary is replaced by any combination of multiple lamps, either in series or parallel or both.

Another embodiment employs the multi-path leakage transformer (described in FIG. 3) fed by any type of converter cyclo-converter, or inverter to power any other type of load set, such as high-frequency welders or ultrasonic transducers, requiring multiple secondaries having independently controlled leakage reactances for each.

It should be understood that, although a particular embodiment of this invention has been described in detail by way of illustration, this invention includes all modifications and equivalents thereof which fall within the scope of the appended claims.

I claim:

1. A dimming inverter ballast for operating and dimming multiple electric gas discharge lamps, which comprises a current feedback inverter and a high leakage transformer, said inverter and said high leakage transformer having a primary coil and a single secondary coil tuned to a high frequency for optimum power transfer and maximum light output from the lamp loads, and wherein a single magnetic path links both the primary coil and the secondary coil.

2. A dimming inverter ballast, according to claim 1, capable of operating over a wide range of input voltages of at least one decade to permit dimming light output linearly in relation to power consumption.

3. A dimming inverter ballast, according to claim 1, wherein the electric power source is an A.C. electric power source.

4. A dimming inverter ballast, according to claim 1, wherein the electric power source is a D.C. electric power source.

5. A dimming inverter ballast, according to claim 1, wherein the electric gas discharge lamp loads are fluorescent lamps.

6. A dimming inverter ballast, according to claim 1, operating at high frequencies ranging from approximately 20 KHs and higher.

7. A dimming inverter ballast, according to claim 1, wherein the current feedback inverter includes variable impedance networks.

\* \* \* \* \*

UNITED STATES PATENT AND TRADEMARK OFFICE
CERTIFICATE OF CORRECTION

PATENT NO. : 4,100,476
DATED : July 11, 1978
INVENTOR(S) : Horace Ghiringhelli

It is certified that error appears in the above-identified patent and that said Letters Patent are hereby corrected as shown below:

Column 2, line 13, "The" should be --This--;

Column 3, line 66, "$F_{op}=(E \cdot 10^8)/4 \cdot N_B \cdot A \cdot B_M$" should be $$--F_{op}= \frac{E \cdot 10^8}{4 \cdot N_B \cdot A \cdot B_M} --;$$

Column 4, lines 49 and 50, "$G_1=(N_{C1}/N_{B1}) = (I_{C1}/I_{B1})$" should be $$--G_1 = \frac{N_{C1}}{N_{B1}} = \frac{I_{C1}}{I_{B1}} --;$$

Column 4, line 52, after "are" insert --as--;

Column 4, line 59, "$G_2 = (N_{C2}/N_{B2}) = (I_{C2}/I_{B2})$" should be $$--G_2 = \frac{N_{C2}}{N_{B2}} = \frac{I_{C2}}{I_{B2}} --;$$

Column 6, line 13, after "70A-70B" insert --, and 72A-72B--;

Column 7, lines 57 and 58, delete both lines 57 and 58 which are an incorrect version of the two lines following, namely 59 and 60;

UNITED STATES PATENT AND TRADEMARK OFFICE
CERTIFICATE OF CORRECTION

PATENT NO. : 4,100,476
DATED : July 11, 1978
INVENTOR(S) : Horace Ghiringhelli

It is certified that error appears in the above-identified patent and that said Letters Patent are hereby corrected as shown below:

Column 10, line 29, delete the comma after "80";

Column 10, line 64, "with" should be --which--; and

Column 11, line 12, "out" should be --any--.

Signed and Sealed this

Fifteenth Day of May 1979

[SEAL]

Attest:

RUTH C. MASON
*Attesting Officer*

DONALD W. BANNER
*Commissioner of Patents and Trademarks*